United States Patent [19]
Rikiyama

[11] Patent Number: 5,339,308
[45] Date of Patent: Aug. 16, 1994

[54] SIGNAL SIZE JUDGING APPARATUS
[75] Inventor: Hiroki Rikiyama, Tokyo, Japan
[73] Assignee: NEC Corporation, Tokyo, Japan
[21] Appl. No.: 19,656
[22] Filed: Feb. 19, 1993
[30] Foreign Application Priority Data
Feb. 19, 1992 [JP] Japan .................. 4-069636
[51] Int. Cl.[5] .................. H04J 3/12; H04J 3/22
[52] U.S. Cl. .................. 370/17; 370/79; 370/110.1
[58] Field of Search .................. 370/79, 80, 82, 84, 370/112, 110.1; 359/135

[56] References Cited
U.S. PATENT DOCUMENTS
5,062,105 10/1991 McKnight et al. .................. 370/84
5,168,494 12/1992 Mueller .................. 370/79 X Primary Examiner—Douglas W. Olms
Assistant Examiner—Melvin Marcelo
Attorney, Agent, or Firm—Sughrue, Mion, Zinn, Macpeak & Seas

[57] ABSTRACT

A signal size judging apparatus is disclosed that comprises of a separating circuit, a plurality of judging circuit and a connection status deciding circuit. The separating circuit receives the multiplexed signal and separating it into its constituent basic signals for each channel. The judging circuits are provided to correspond to each of the basic signals for each channel except the foremost channel and is supplied with the basic signals for each of the channels from the separating circuit and judges whether or not each basic signal is connected to the basic signal for the immediately preceding channel. The connection status deciding circuit decides as to how the basic signals for all of the channel are connected on the bases of the possible results of judgment performed by the judging circuit.

2 Claims, 6 Drawing Sheets

8 DENOTES AN 8-BIT BYTE

SIGNAL SIZE JUDGING APPARATUS

BACKGROUND OF THE INVENTION

1. Field of the Invention

The present invention relates to a signal size judging apparatus, that is, an apparatus for judging the connection status of the basic signals for a plurality of constituent channels, said basic signals having particular bit rate and frame construction, in a digital transmission system capable of transmitting signals of higher bit rate than the particular bit rate. This can be realized by providing an identification signal indicating connection with immediately preceding basic signal within a frame at the time of synchronous multiplexing after frame alignment of the basic signals for the plurality of channels to connect the basic signals for the plurality of channels within a multiplexed signal.

2. Description of the Prior Art

As an example of the digital transmission system of this kind, the SONET (Synchronous Optical Network) which is to be designated as the standard transmission system in North America will be mentioned hereinafter. In this transmission system, the standard transmission rate and the frame period are set at 51.84 Mb/s and 125 μs, respectively, as shown in FIG. 1. Among 810 bytes (90 bytes × 8 rows) which constitute one frame, 27 bytes are allocated to the TOH (Transport Overhead) which is designed to administrate the transmission line conditions, and the remaining 783 bytes are allocated to the information bits. Furthermore, as shown in FIG. 2, the frame construction of the signal made by multiplexing N signals constituting the frame construction shown in FIG. 1 is defined as the STS-N frame whose transmission rate is set at 51.84×N Mb/s.

However, it is impossible to transmit signals which require a frequency bandwidth of over 50 Mb/s when such frame construction is used. For example, basic signals consisting of three channels shown in FIG. 3A are multiplexed in terms of byte unit as shown in FIG. 3B. Here, H1 and H2 designate the start of the basic signal within the payload. However, a signal having the bit rate of 150 Mb/s cannot be transmitted with the frame shown in FIG. 3B. To enable transmission of signals having a bit rate of over 50 Mb/s, it is conventionally done to connect a plurality of frames within the multiplexed signal by providing an identification signal indicating the connection of the basic signal with the immediately preceding basic signal within a frame. In the case of a signal consisting of three channels, for example, as shown in FIG. 3A, the start of the signal within the payload is designated by the first H1 and H2 and the connection of the first channel with the second and the third channels are designated by the identification signs H1* and H2*, respectively.

The multiplexed signal receiver includes an apparatus for judging whether the frame concerned transmits an independent signal or is connected with the immediately preceding frame to allow the transmission of a signal having higher bit rate, that is, the size of the received signals. In order to avoid errors in operation caused by the disorder of the transmission lines, the apparatus for judging signal size is constructed so that it judges that the series of frames are actually connected to each other only when the identification signals of connection are received in succession for a certain fixed period of time (usually of the order of three frames).

FIG. 5 is the block diagram of an example of the conventional apparatus for judging signal size. A quadrupling arrangement is exemplified herein. The received multiplexed signal is separated into the basic signals CH1, CH2, CH3 and CH4 for four channels, respectively, by means of the separating circuit 1. The basic signals CH1, CH2, CH3 and CH4 are introduced into the judging circuit 2, where all of the basic signals CH1, CH2, CH3 and CH4 are judged to be connected together provided that inclusion of identification signals showing the connections is confirmed in each of the basic signals CH2, CH3 and CH4. The signal 6 is then set to a logic 1. The basic signals CH1 and CH2 are introduced into the judging circuit 3, where both of the basic signals CH1 and CH2 are judged to be connected together provided that inclusion of identification signal showing the connection is confirmed only in the basic signal CH2. The signal 7 is then set to a logic 1. The basic signals CH3 and CH4 are introduced into the judging circuit 4, where both of the basic signals CH3 and CH4 are judged to be connected together provided that inclusion of identification signal showing the connection is confirmed only in the basic signal CH4. The signal 8 is then set to a logic 1. Signals 6, 7 and 8 are introduced into the connection status deciding circuit 5 and all of the basic signals CH1, CH2, CH3 and CH4 are judged to be connected together when signal 6 is a logic 1. The signal 9 is then set to a logic 1. Similarly, only CH1 and CH2 are judged to be connected together provided that signals 6 and 8 are both a logic 0 and signal 7 is a logic 1. The signal 10 is then set to a logic 1. Furthermore, only CH3 and CH4 are judged to be connected together provided that signals 6 and 7 are both a logic 0 and signal 8 is a logic 1. The signal 11 is then set to a logic 1.

As explained above, since the conventional signal size judging apparatus is provided with a plurality of individual judging circuits for all possible different-sized receiving signals, it has a disadvantage that as the number of multiplex increases, the number of judging circuits also increases, thereby making the circuit scale larger.

SUMMARY OF THE INVENTION

It is an object of the present invention to provide a signal size judging apparatus which is capable of judging the connection status of basic signals of a plurality of channels by means of a circuit constructed on a much smaller scale.

The signal size judging apparatus according to the present invention comprising:
   separating means for receiving the received multiplexed signal and for separating it into its constituent basic signals for each channel, a set of judging means, each corresponding to the basic signals for each channel except the foremost channel, for receiving the output basic signals of the separating means and for judging whether or not the basic signal of the channel concerned is connected to the basic signal of the channel immediately preceding said channel, and connection status deciding means for deciding as to how the basic signals of the plurality of channels are connected on the basis of all possible results of the judging means.

Other features and advantages of the invention will be apparent from the following description taken in conjunction with the accompanying drawings.

DESCRIPTION OF THE PREFERRED EMBODIMENT

Figure 1:
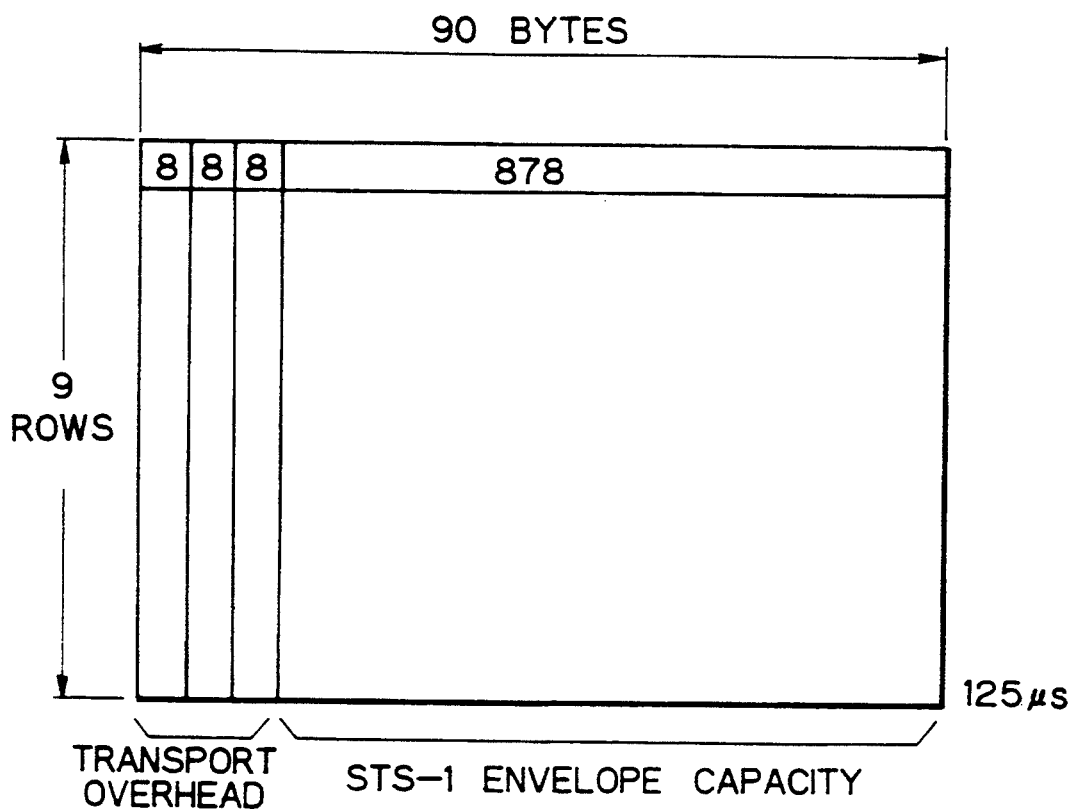
FIG. 1 is a view showing the construction of the frame of a basic signal in a Synchronous Optical Network, SONET.
Figure 2:
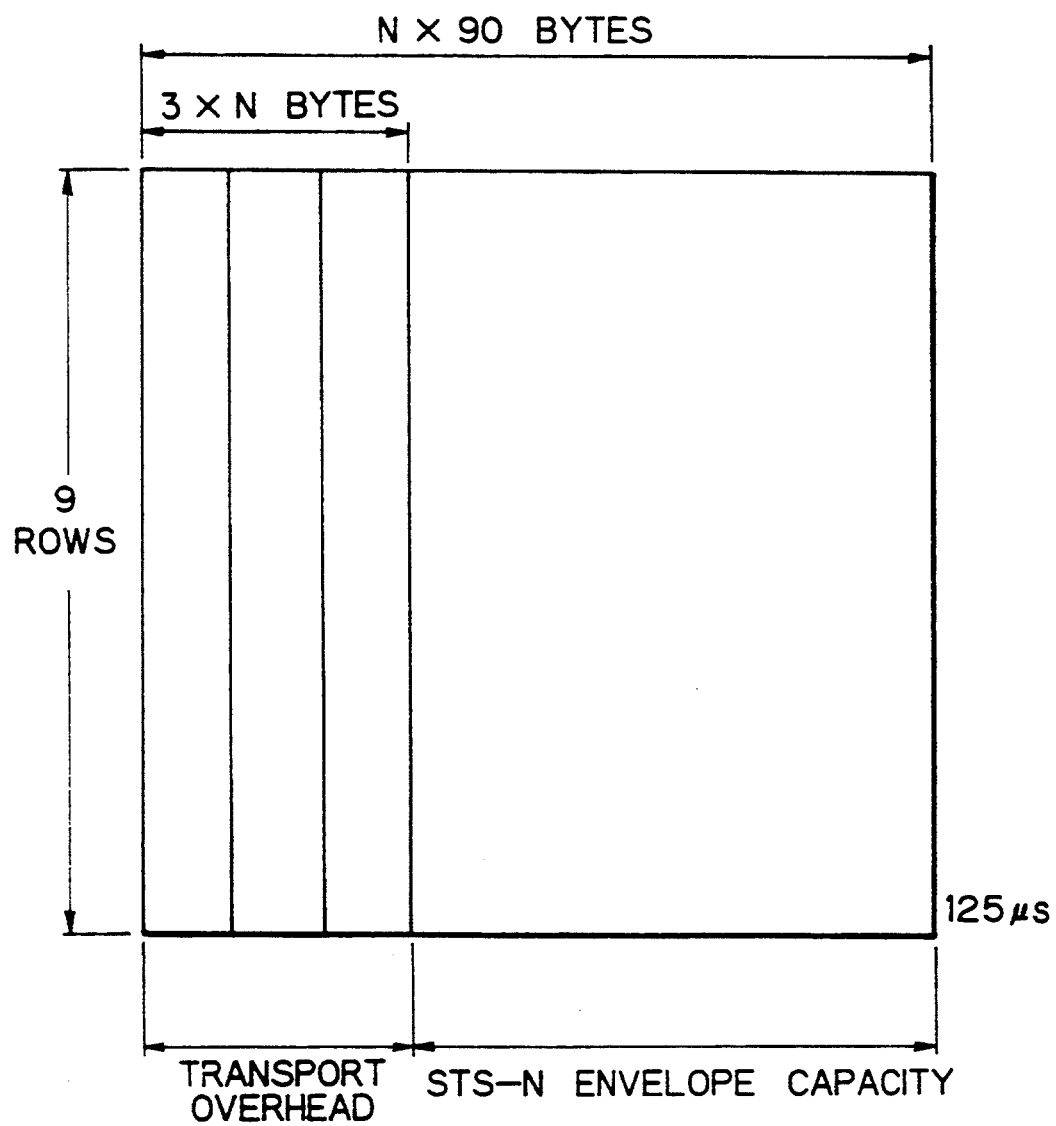
FIG. 2 is a view showing the construction of the frame of basic signals of the synchronously multiplexed N channel in the SONET.
Figure 3A:
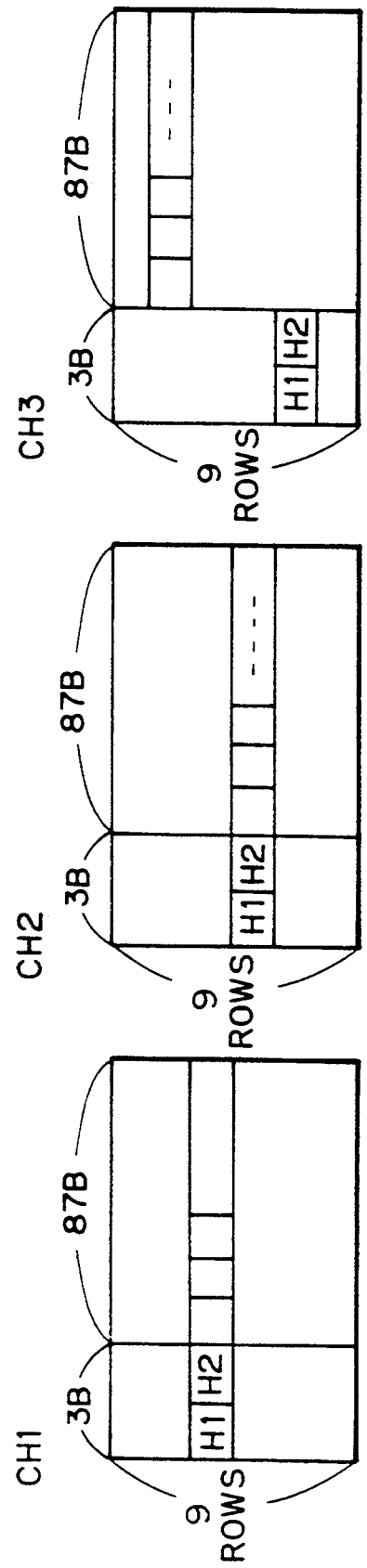
FIG. 3A is a view showing the construction of the frame of the basic Signals for three channels in the SONET.
Figure 3B:
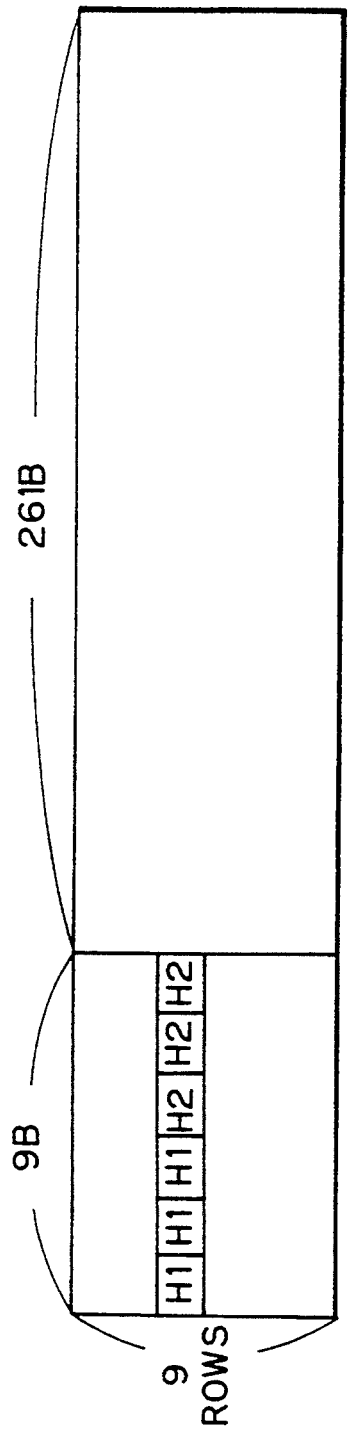
FIG. 3B is a view showing the construction of the frame of the synchronously multiplexed basic signals for three channels in the SONET shown in FIG. 3A.
Figure 4:
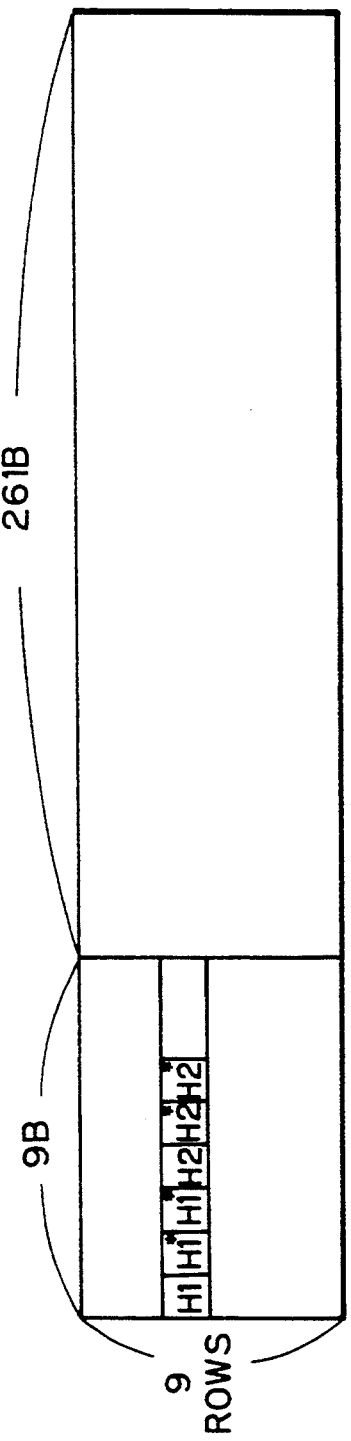
FIG. 4 is a view showing the construction of the frame of the basic signal made by connecting the basic signals for the three channels shown in FIG. 3A.
Figure 5:
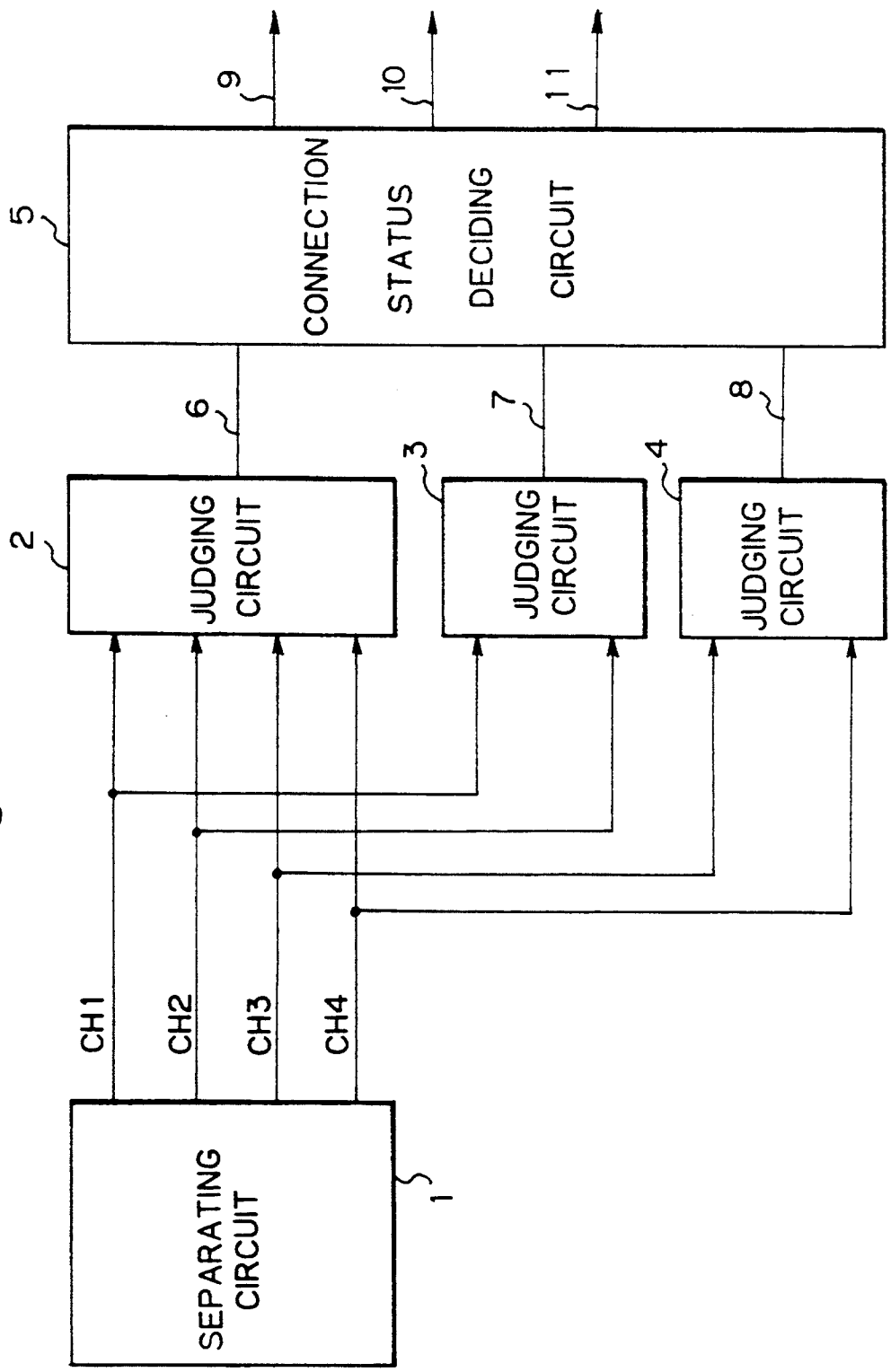
FIG. 5 is a block diagram of the example of a conventional signal size judging apparatus.
Figure 6:
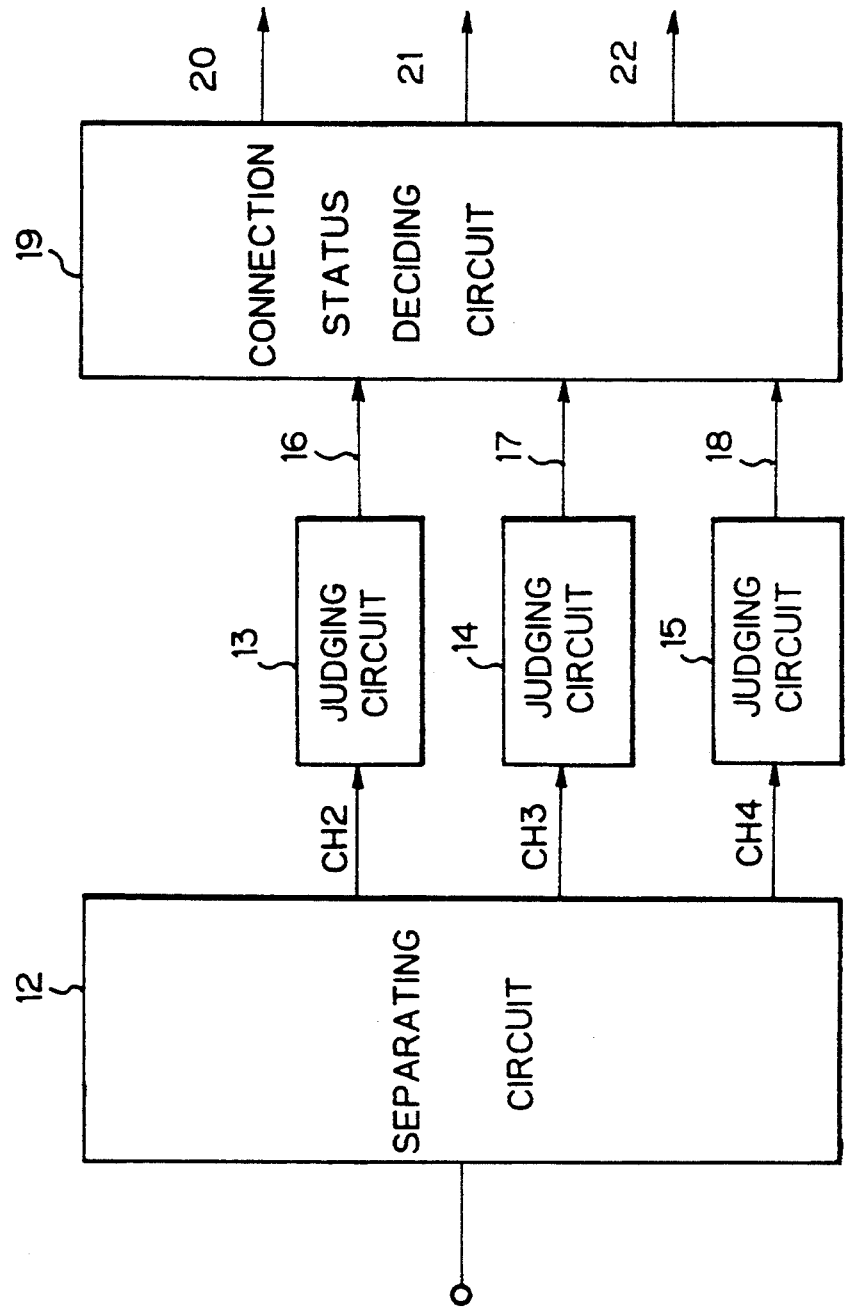
FIG. 6 is a block diagram of an embodiment of the signal size judging apparatus according to the present invention.

An embodiment of the signal size judging apparatus according to the present invention will be explained hereinafter with reference to FIG. 6. A quadrupling arrangement of the multiplexed signal is here presented as an example.

The separating circuit 12 receives the multiplexed signal and separates it into basic signals CH1, CH2, CH3 and CH4 for four channels. The judging circuits 13, 14 and 15 are supplied with the separated basic signals CH2, CH3 and CH4, respectively. The judging circuit 13 sets its output signal 16 to a logic 1 when it detects the identification signals within three successive frames of the basic signal CH2. The judging circuit 14 sets its output signal 17 to a logic 1 when it detects the identification signals within three successive frames of the basic signal CH3. The judging circuit 15 sets its output signal 18 to a logic 1 when it detects the identification signals within three successive frames of the basic signal CH4. The output signals 16, 17 and 18 of the respective judging circuits 13, 14 and 15 are inputted into the connection status deciding circuit 19. The circuit 19 first decides whether or not all of the output signals 16, 17 and 18 are logic 1s, and if so, sets only output signal 20 to a logic 1 because the basic signals CH1, CH2, CH3, and CH4 are all connected. When one or more of the signals 16, 17 and 18 are not a logic 1, the circuit 19 judges whether or not only signal 16 is a logic 1. If it is, the circuit 19 sets only the output signal 21 to a logic 1 because basic signals CH1 and CH2 are connected. When the signal 16 is not a logic 1, the circuit 19 judges whether or not only the signal 18 is a logic 1. If it is, the circuit 19 sets only the output signal 22 to a logic 1 because basic signals CH3 and CH4 are connected. When all of the signals 16, 17, and 18 are logic 0s, the output signals 20, 21, and 22 all remain logic 0s because basic signals CH1, CH2, CH3, and CH4 are not connected.

Although the explanation given above refers only to the case of a quadrupling arrangement, signal size judgment for the case of n (n=$2^m \times$k, n, m and k are positive integers) the multiplication is similarly possible.

The decision is first made whether or not n basic signals are connected. When n basic signals are not all connected, the decision is made whether or not the first half n/2 basic signals are connected and whether or not the second half n/2 basic signals are connected. When the first half n/2 basic signals and/or the second half n/2 basic signals are not connected, similar decisions are performed with the basic signal judged as unconnected being divided into the first half ones and the second half ones until unconnected basic signals does not exist or the number of the divided basic signals becomes two.

Incidentally, the connection status deciding circuit 19 is actually constituted of combinational circuits and hence the decision for a connection status can be performed in a single step.

While a preferred embodiment of the invention has here been described using specific terms, this description is for illustrative purposes only, and it is to be understood that changes and variations may be made without departing from the spirit or scope of the following claims.

What is claimed is:

1. A signal size judging apparatus for judging the connection status of basic signals for a plurality of constituent channels, said basic signals having particular bit rate and frame construction, in a digital transmission system capable of transmitting signals of higher bit rate than the particular bit rate by inputting identification signals indicating connection with immediately preceding basic signal within a frame at the time of synchronous multiplexing after frame alignment of the basic signals of a plurality of channels to connect the basic signals for the plurality of channels within a multiplexed signal, comprising:

separating means for receiving the multiplexed signal and for separating the multiplexed signal into its constituent basic signals for each channel, a set of judging means, each corresponding to the basic signal for each channel except the foremost channel, for receiving the output basic signals of said separating means and for judging whether or not the basic signal for the channel concerned is connected to the basic signal for the channel immediately preceding said channel, and connection status deciding means for deciding as to how the basic signals for the plurality of channels are connected on the basis of all of the possible results of judgment of said judging means.

2. An apparatus according to claim 1, wherein in the case of the bit rate of said multiplexed signal being n times higher than that of the basic signal, where n=$2^m \times$k, and n, m and k are positive integers, said connecting status deciding means first decides whether or not n basic signals are connected, and when n basic signals are not all connected, said connecting status deciding means decides whether or not the first half n/2 basic signals are connected and whether or not the second half n/2 basic signal are connected, and when the first half n/2 basic signals and/or the second half n/2 basic signals are not connected, said connecting status deciding means performs similar decisions with the basic signal judged as unconnected being divided into the first half ones and the second half ones until unconnected basic signals does not exist or the number of the divided basic signals becomes two.

* * * * *

UNITED STATES PATENT AND TRADEMARK OFFICE
CERTIFICATE OF CORRECTION

PATENT NO.   : 5,339,308
DATED        : August 16, 1994
INVENTOR(S)  : Rikiyama

It is certified that error(s) appears in the above-identified patent and that said Letters Patent is hereby corrected as shown below:

Column 3, line 10, change "Signals" to --signals--;

line 48, change "is" to --1S--.

Signed and Sealed this

Eighteenth Day of April, 1995

Attest:

BRUCE LEHMAN

Attesting Officer

Commissioner of Patents and Trademarks